United States Patent [19]

Tagliaferri

[11] Patent Number: 5,176,056
[45] Date of Patent: Jan. 5, 1993

[54] PANEL CUTTING MACHINE

[75] Inventor: Renzo Tagliaferri, Piacenza, Italy

[73] Assignee: Selco S.r.l., Crespellano, Italy

[21] Appl. No.: 890,369

[22] Filed: May 26, 1992

Related U.S. Application Data

[63] Continuation of Ser. No. 599,043, Oct. 17, 1990, abandoned.

[30] Foreign Application Priority Data

Oct. 26, 1989 [IT] Italy .................. 3672 A/89

[51] Int. Cl.$^5$ .............................................. B26D 7/06
[52] U.S. Cl. ...................................... 83/76.1; 83/157;
83/256; 83/404.2
[58] Field of Search .............. 83/76.1, 157, 256, 255,
83/404, 404.1, 404.2, 934

[56] References Cited

U.S. PATENT DOCUMENTS

| | | | |
|---|---|---|---|
| 4,048,887 | 9/1977 | Morse et al. | 83/404.2 |
| 4,317,397 | 3/1982 | Ess | 83/404.1 |
| 4,341,135 | 7/1982 | Ufermann et al. | 83/404.2 |
| 4,381,686 | 5/1983 | Ess | 83/404.2 |
| 4,641,555 | 2/1987 | Johnson et al. | 83/404.2 |
| 4,815,349 | 3/1989 | Urs | 83/404 |

FOREIGN PATENT DOCUMENTS

| | | | |
|---|---|---|---|
| 362129 | 4/1981 | Austria . | |
| 2417083 | 10/1975 | Fed. Rep. of Germany | 83/404 |
| 3110860 | 1/1982 | Fed. Rep. of Germany . | |
| 3034205 | 2/1982 | Fed. Rep. of Germany . | |
| 3300351 | 7/1984 | Fed. Rep. of Germany . | |
| 8236595 | 3/1986 | Fed. Rep. of Germany . | |
| 3716666 | 12/1987 | Fed. Rep. of Germany . | |
| 2122123 | 8/1972 | France . | |

*Primary Examiner*—Frank T. Yost
*Assistant Examiner*—Scott A. Smith
*Attorney, Agent, or Firm*—Palmatier & Sjoquist

[57] ABSTRACT

A machine that includes: A transportation system is disclosed for transporting panels such as wood panels between two cutting stations which cut the panels along different axes. The transportation system includes, between the cutting stations, a work surface of parallel bars. The work surface further includes three portions disposed at different levels while maintaining the bars in a parallel and aligned fashion such that a slide, also including parallel bars, may pass horizontally between the three portions. The slide operates vertically as well as horizontally to pick up the panels for transport among the three work surface portions, whose different heights permit a number of different stages of operation for the slide.

4 Claims, 4 Drawing Sheets

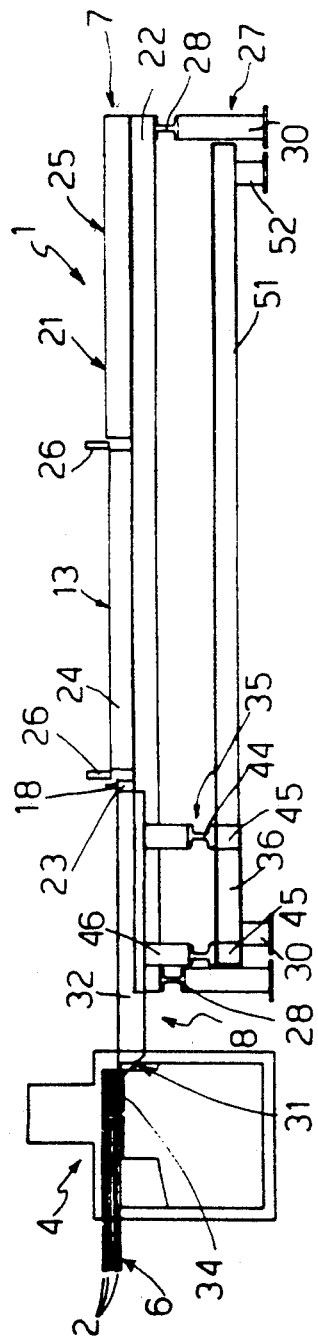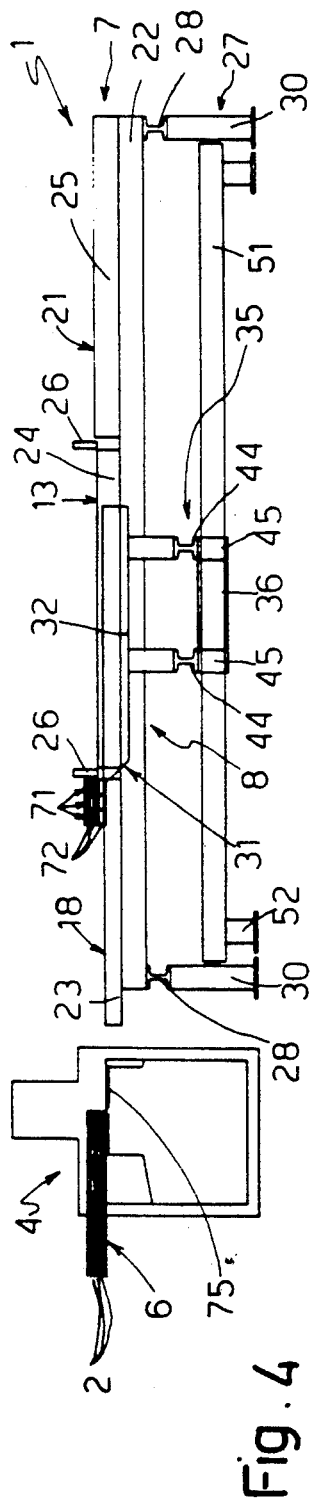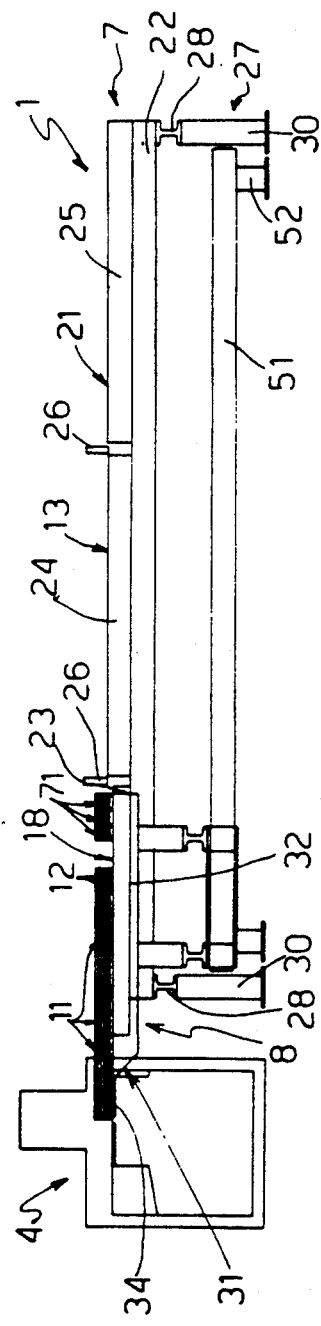

PANEL CUTTING MACHINE

This is a continuation of copending application Ser. No. 07/599,043 filed on Oct. 17, 1990 now abandoned.

BACKGROUND OF THE INVENTION

The present invention relates to a machine for cutting panels of wood, fibreboard, plastic or similar material. Known cutting machines include substantially two cutting stations, one for cutting along a first axis and the other for cutting along a second axis perpendicular to the first; a panel conveyor belt; a first pusher for pushing a series of packed cut strips from the first cutting station to a pickup point on the conveyor; and a second pusher for pushing said series of packed strips from a limit stop position on the conveyor to the second cutting station.

A major drawback of known cutting machines of the aforementioned type is that the transportation system between the two cutting stations fails to provide for firm packing of the cut strips. In the case of thin, narrow strips in particular, these may be shifted out of line as they are pushed towards the second cutting station, with all the disadvantages this entails as regards the second cut.

SUMMARY OF THE INVENTION

The aim of the present invention is to provide a panel cutting machine designed to overcome the above drawback, i.e. which features a transportation system designed to ensure the packed strips are kept perfectly aligned.

Further aims and advantages of the present invention will be revealed in the following description.

With this aim in view, according to the present invention, there is provided a machine for cutting panels of wood, fibreboard, plastic or similar material, characterised by the fact that it includes:

(a) a first work surface fed in known manner with a first pack of panels;

(b) a first cutting station at one end of the first work surface;

(c) a first pusher designed, at each operating cycle, to push the first pack in stages along the first work surface towards the first cutting station;

(d) a second work surface aligned with the first work surface;

(e) a slide designed to travel along the longitudinal axis of the second work surface, to travel along a vertical axis, to pick up a second pack of strips produced by cutting the first pack along a first axis in the first cutting station, and to transfer the second pack towards a first portion of the second work surface;

(f) a third work surface having its longitudinal axis perpendicular to that of the second work surface, and one end close to the first portion;

(g) a second cutting station located at the end of the third work surface, and designed to cut the second pack along a second axis perpendicular to the first axis;

(h) a second pusher designed, at each operating cycle, to push the second pack from the first portion towards the second cutting station;

(i) first drive means for moving the slide along the longitudinal axis of the second work surface;

(j) second drive means for moving the slide along a vertical axis in relation to the second work surface; and (k) an electronic control system for controlling the operating cycle.

BRIEF DESCRIPTION OF THE DRAWINGS

A preferred, non-limiting embodiment of the present invention will be described by way of example with reference to the accompanying drawings, in which:

FIGS. 3 to 8 show various stages in a specific operating cycle of the machine of FIG. 1.

DETAILED DESCRIPTION OF THE INVENTION

Figure 1:
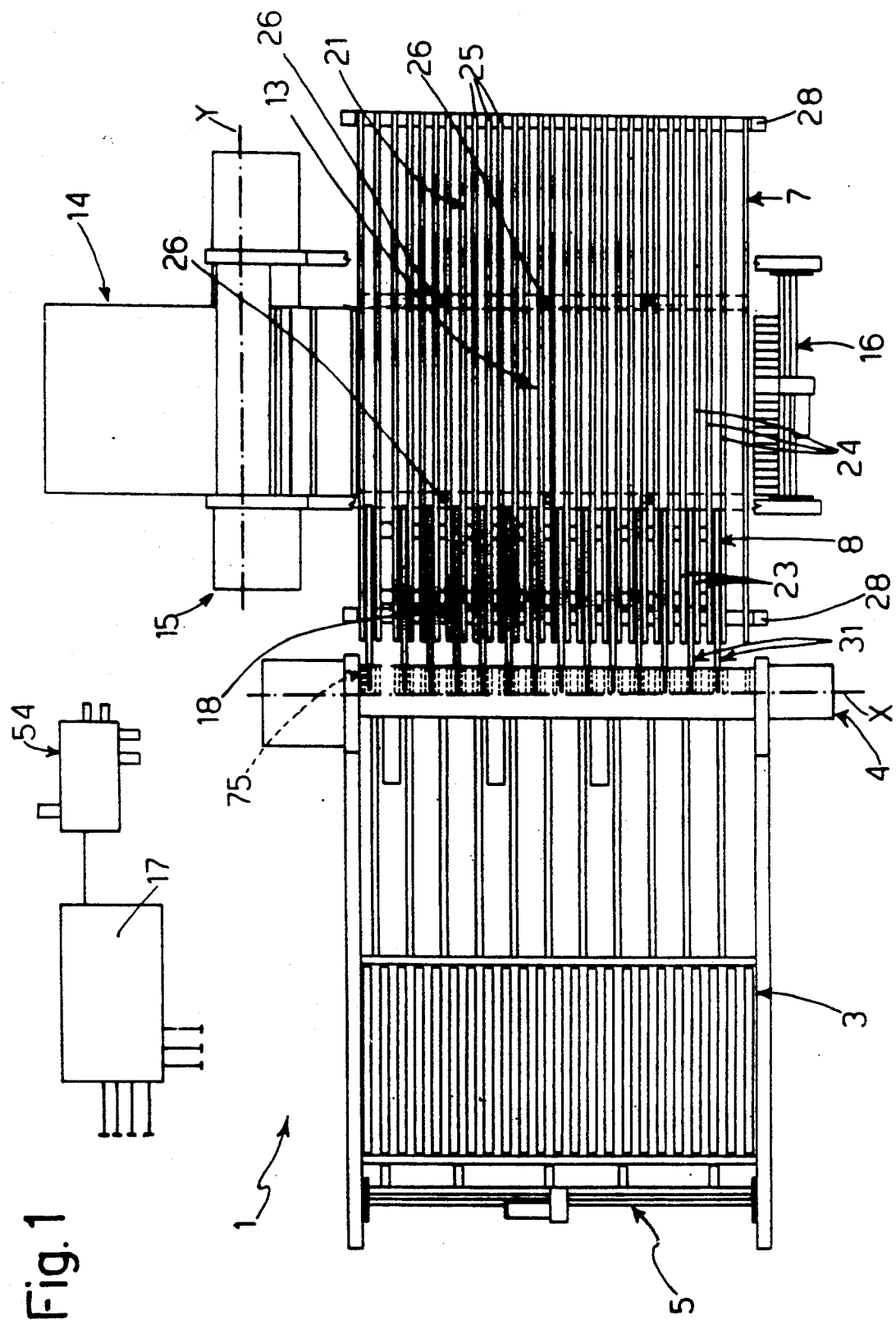
FIG. 1 shows a partial schematic view of a panel cutting machine in accordance with the present invention.
Figure 2:
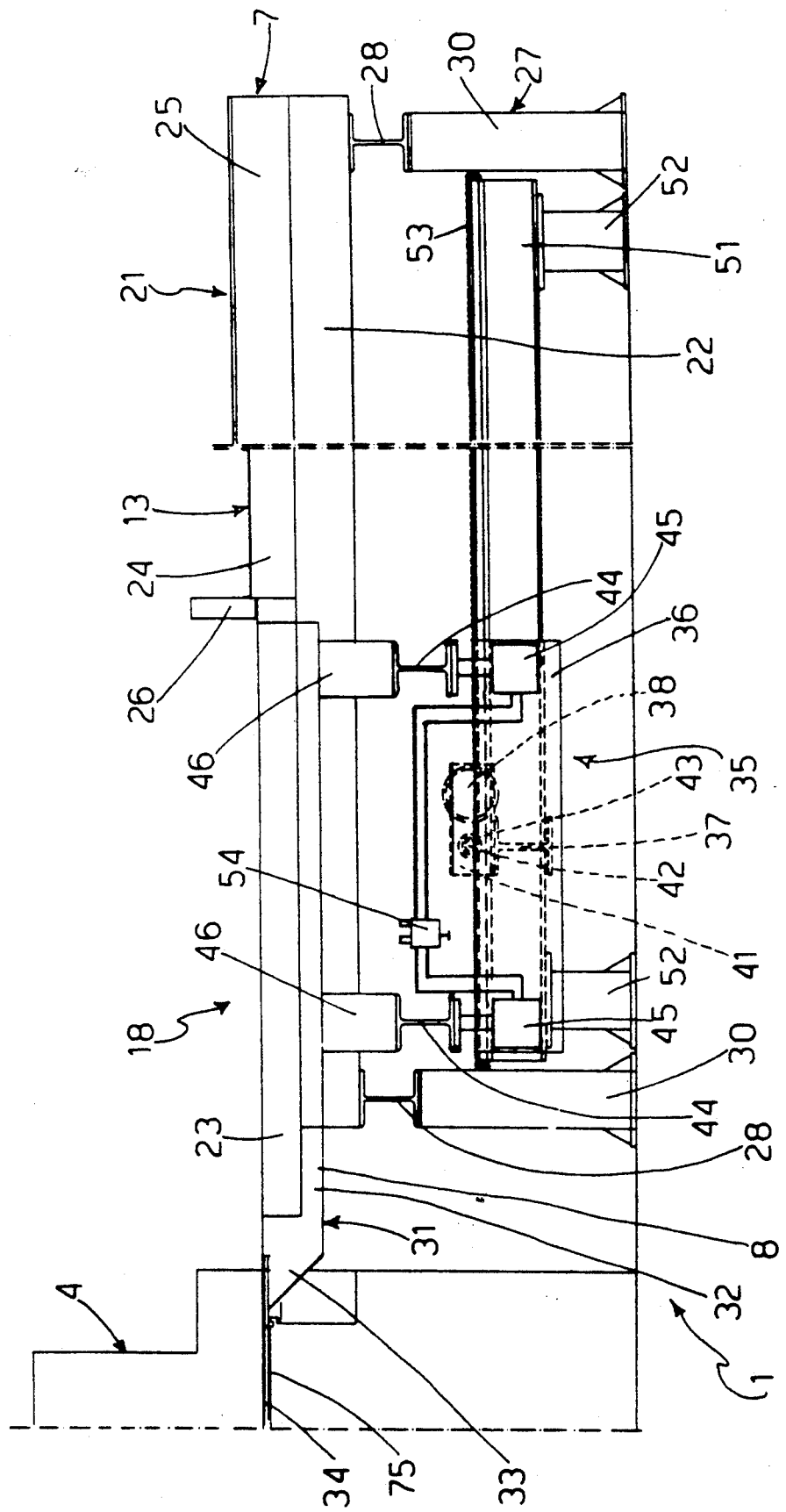
FIG. 2 shows a partially sectioned side view of part of the machine of FIG. 1.

Number 1 in FIGS. 1 and 2 indicates a machine for cutting panels 2 of wood, fibreboard, plastic or similar material.

Machine 1 includes:

a first work surface 3 fed in known manner with a pack 6 of panels 2;

a first cutting station 4 at one end of work surface 3;

a first pusher 5 designed, at each operating cycle of machine 1, to push pack 6 along work surface 3 towards cutting station 4;

a second work surface 7 aligned with work surface 3;

a slide 8 designed to travel along work surface 7, to pick up a pack 11 of strips 12 produced by cutting pack 6 along the X axis in station 4, and to transfer pack 11 towards portion 13 of work surface 7;

a third work surface 14 having its longitudinal axis perpendicular to that of work surface 7, and one end close to the portion 13;

a second cutting station 15 located at the end of work surface 14 and designed to cut pack 11 along the Y axis perpendicular to the X axis;

a second pusher 16 designed, at each operating cycle, to push a series of packs 11 from portion 13 towards cutting station 15;

first drive means for moving slide 8 along the longitudinal axis of work surface 7;

second drive means for moving slide 8 along a vertical axis in relation to work surface 7; and an electronic control system 17 for controlling operation of machine 1.

Cutting stations 4 and 15, pushers 5 and 16, and the design of work surfaces 3 and 14 are known and will therefore only be described briefly. In particular, cutting stations 4 and 15 include cutting members supported on a carriage driven by a motor along the cutting axis and normally by hydraulic actuators along a vertical axis. Each cutting member presents a circular include blade powered by a respective motor. Pushers 5 and 16 substantially a bar driven by a motor back and forth parallel to its longitudinal axis. Each bar is fitted with a number of equally spaced elements designed to contact and move packs 6 or 11.

Along its longitudinal axis, work surface 7 defines substantially three in-line work portions. The first portion, numbered 18, is the portion of surface 7 closest to cutting station 4, and presents its upper surface substantially on a level with the upper surface of work surface 3. The second portion, numbered 13, is located adjacent to portion 18, and presents its upper surface higher than that of portion 18 and substantially on a level with that of work surface 14. The third portion, numbered 21 and referred to for reasons described later on as the hold portion, is located adjacent to portion 13, and presents its upper surface higher than that of portion 13.

Work surface 7 includes a number of equally spaced, prismatic, bottom bars 22 parallel to one another and to the longitudinal axis of work surface 7, and arranged horizontally with their largest faces upright. At portion 18, bars 22 are fitted with respective bars 23 similar to, arranged in the same way as, but shorter than bars 22. In particular, bars 23 project frontwards towards station 4, beyond the respective ends of bars 22, so as to define, with their upper faces and axial ends, the upper surface and axial confines of portion 18 respectively. At portion 13, bars 22 are fitted with respective bars 24 similar to, and arranged in the same way as, bars 23, and the upper faces and axial ends of which define the upper surface and axial confines of portion 13 respectively. For enabling smooth transfer of packs 11 to second cutting station 15, the upper surface of each bar 24 presents a number of rollers having a horizontal rotation axis perpendicular to the longitudinal axis of work surface 7. At portion 21, bars 22 are fitted with respective bars 25 similar to, and arranged in the same way as, bars 23 and 24, and the upper faces and axial ends of which define the upper surface and axial confines of portion 21 respectively.

As shown in the accompanying drawings, between bars 23 and 24 and bars 24 and 25, a space is defined in which operates a respective known aligning device. The device includes a number of vertical pins 26 aligned along a straight horizontal line perpendicular to the longitudinal axis of work surface 7, and designed to slide axially by virtue of known drive means, usually pneumatic, controlled by system 17. The row of pins 26 between bars 23 and 24 acts as a square for station 15, by virtue of being aligned with the lateral edge of work surface 14 as shown in FIG. 1. Pins 26 in the row defined between bars 24 and 25 are also designed to move along the longitudinal axis of work surface 7, for pushing packs 11, at a given stage of the cycle, towards the first row of pins 26 and so aligning the same. It should be noted that, with pins 26 positioned normally, as shown in the accompanying drawings, the bottom ends of all the pins 26 on both devices are substantially flush with the upper surface of portion 13.

As shown in FIG. 2, work surface 7 comprises a bed 27 having two parallel horizontal beams 28 perpendicular to the longitudinal axis of work surface 7. Each beam 28 supports one end of bars 22 on top, and is supported at the bottom on a vertical foot 30.

As shown in FIG. 2, slide 8 includes a number of equally spaced bars 31 parallel to one another and to the longitudinal axis of work surface 7, and arranged horizontally with their largest faces upright.

As shown in FIG. 1, each bar 31 is located between two pairs of bars 22 to enable it to slide both horizontally and vertically. Pins 26 are installed in the gaps between bars 22 not engaged by a respective bar 31. The two rows of pins 26 may of course be offset in relation to each other.

Each bar 31 includes a substantial portion 32 of constant vertical thickness; a small central portion 33 decreasing in vertical thickness towards station 4; and a small end portion 34 of constant vertical thickness but considerably less than that of portion 32. The three portions 32, 33 and 34 naturally differ in thickness at the bottom, the upper surfaces being flush. Slide 8 includes a carriage 35 designed to travel along the longitudinal axis of work surface 7 and having:

- two parallel couplings 36 located beneath and parallel to the longitudinal axis of work surface 7;
- a number of horizontal beams 37 for transversely connecting couplings 36 (for the sake of simplicity, only one connecting the center lines of couplings 36 is shown by the dotted line in FIG. 2);
- an electric motor 38 (shown by the dotted line) supported on one of beams 37;
- a reduction member 41 (shown by the dotted line) also supported on a beam 37, connected to motor 38, and having an output shaft 42 fitted with a gear 43;
- a further two horizontal beams 44 parallel to and higher than beams 37, driven by couplings 36, and designed to move vertically parallel with each other;
- two hydraulic actuators 45 supported by couplings 36 for each beam 44, the end of the vertical piston rod of each actuator 45 being secured to an end of the respective beam 44; and
- a number of parallel, equally spaced spacer plates 46 parallel to the longitudinal axis of work surface 7, arranged with their larger faces and longitudinal axes upright, supported at the bottom on respective beam 44, and supporting a respective bar 31 on top.

As shown in FIG. 2, two parallel slideways 51 are installed beneath and parallel to the longitudinal axis of work surface 7, and supported at each end on feet 52. Each slideway 51 guides a respective coupling 36 by means of a known, e.g. roller, system. Carriage 35 is moved along slideways 51 by gear 43 meshing with a fixed chain 53 extending in a straight line parallel to the longitudinal axis of work surface 7 and secured at the ends to respective fixed bodies. Actuators 45 are operated by control system 17 via a known hydraulic circuit 54 shown schematically in FIGS. 1 and 2.

The operating cycle of machine 1 includes:
(a) a first stage wherein work surface 3 is fed with a pack 6;
(b) a second stage wherein device 5 feeds pack 6 towards station 4 so that a small portion of pack 6 is arranged along the cutting line;
(c) a third stage wherein station 4 trims off said small portion of pack 6;
(d) a fourth stage wherein device 5 feeds pack 6 forward until a portion of predetermined length is positioned along the cutting line of station 4, and wherein the front portion (portions 34 of bars 31) of slide 8 is sufficiently clear of the cutting line to enable the trimmings to drop down;
(e) a fifth stage wherein slide 8, with its upper surface slightly lower than work surface 3, moves towards station 4 so as to bring its front portion close to the cutting line and slightly (2 mm) lower than a comb portion 75 of station 4 supporting pack 11 during the cutting process;
(f) a sixth stage wherein station 4 cuts pack 11 resting on portion 75;
(g) a seventh stage wherein device 5 moves by the same amount as in the fourth stage, while at the same time backing the first pack 11 along slide 8, and so on until the last pack 11 is cut;
(h) an eighth stage wherein pins 26 in the first row are moved down below the level of the upper surface of portion 13; slide 8 moves up beyond the upper surface of portion 13 and towards portion 13 itself; and, as pins 26 move back up, slide 8 at portion 13 moves down below the upper surface of portion 13 for depositing packs 11 on the same;

(i) a ninth stage wherein, as slide 8 moves back beneath portion 13 to station 4 for reloading, the second row of pins 26 moves towards the first for aligning packs 11 along the square in station 15, and, upon return of the second row of pins 26, device 16 (in the same way as device 5 in stages four and seven) provides for feeding packs 11 forward in stages, at each of which packs 11 are cut in station 15.

In the eighth stage, slide 8 may move up much higher in relation to the upper surface of portion 13, thus enabling downward withdrawal of said first row of pins 26 to be dispensed with. Such a cycle affords three major advantages: 1) packs 11 are transferred to portion 13 without having to slide along work surface 7; 2) the last pack 11 is picked up directly from station 4, thus enabling mechanical removing means to be dispensed with; 3) during withdrawal of packs 11 from station 4, slide 8 is located below the upper surface of portion 13, thus enabling withdrawal from station 4 and cutting in station 15 to be performed simultaneously, the advantage of which is primarily economic. Upon completion of the cutting stage in station 15, if pack 11 has already or just been withdrawn, slide 8 may thus provide for feeding further packs 11 towards portion 13.

Figure 6:
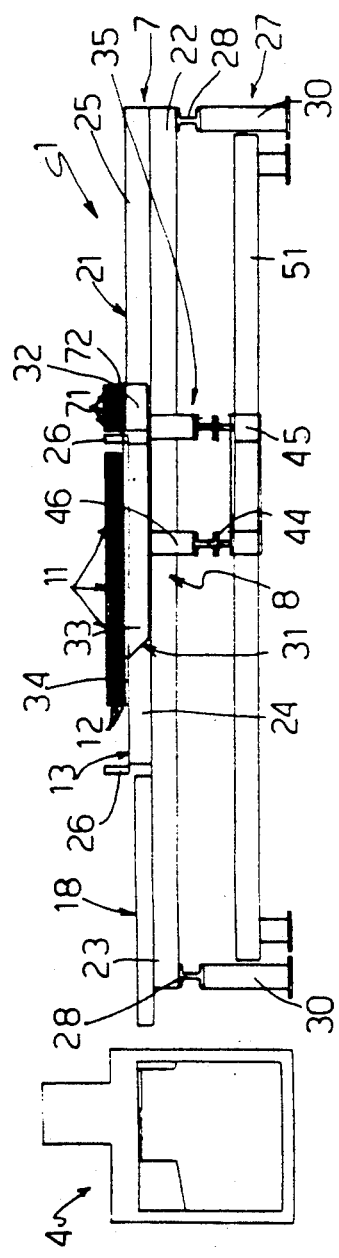
Figure 7:
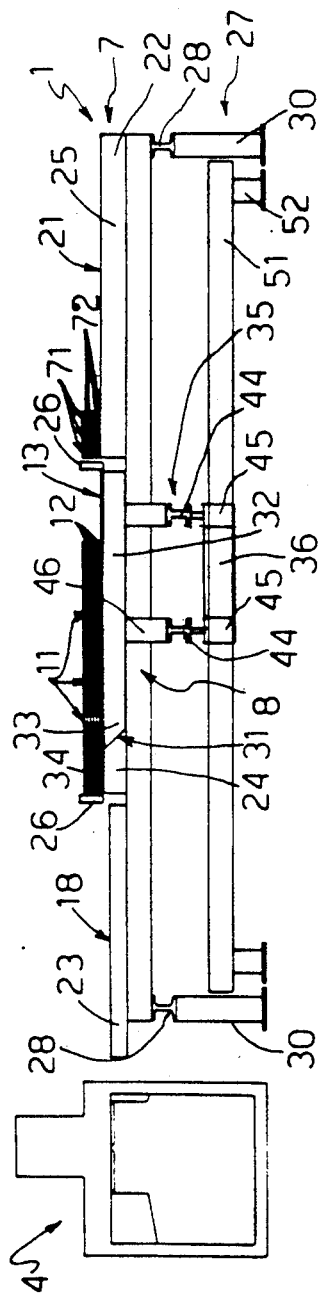
Figure 8:
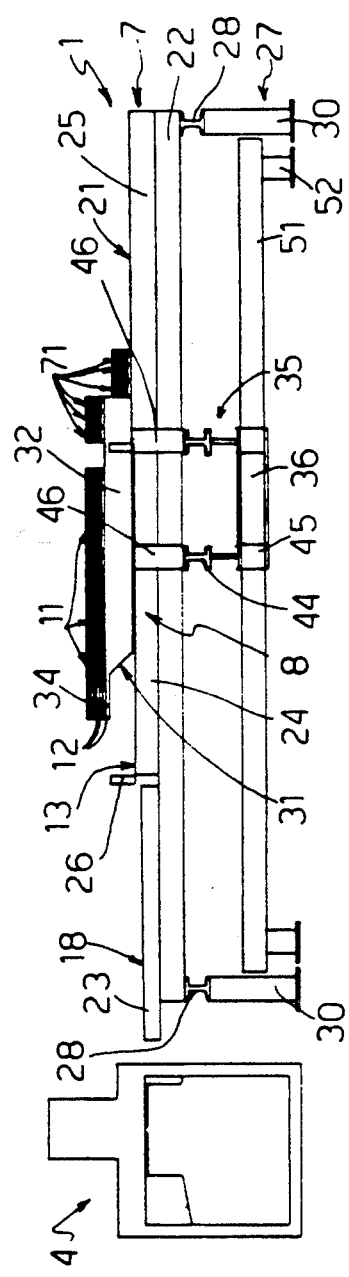

FIGS. 3 to 8 show the operating cycle of machine 1 should part of the material cut in station 15 need to be temporarily or permanently excluded. This cycle is particularly useful when packs 71 of a different (in the example shown, smaller) width from that of packs 11 are cut in station 4, e.g. as when the total width of panels 2 is such as to produce leftover material when cut into strips 12. The leftover material may of course be used for forming strips 72 of which packs 71 are composed. With reference to FIGS. 3 to 8, this cycle comprises:

(a) a first stage wherein pack 6 is fed on to work surface 3;

(b) a second stage wherein pack 6 is fed along work surface 3 and trimmed;

(c) a third stage wherein station 4 cuts pack 6, for example, into three packs 71 which, in the same way as already described, are accumulated on slide 8 which is of course located close to the cutting line and slightly lower than work surface 3;

(d) a fourth stage wherein slide 8 moves up halfway between portions 18 and 13, then travels towards portion 13 for feeding packs 71 to the rear of portion 18, where it then moves down for unloading packs 71;

(e) a fifth stage wherein slide 8 moves back beneath portion 18 to station 4, and packs 71 are cut perpendicularly, as already described, into packs 11, which are accumulated (FIG. 5) on slide 8 at a suitable distance from packs 71;

(f) a sixth stage wherein slide 8 moves up over the top end of pins 26, travels towards portion 21 so as to feed packs 71 to portion 21 and packs 11 to portion 13, then moves down halfway between portions 13 and 21 so as to unload packs 71 in portion 21 (FIG. 6);

(g) a seventh stage wherein, at the same level as in the sixth stage, slide 8 moves back to station 4 so that packs 11 (FIG. 7) retained by the first row of pins 26 are left in station 13;

(h) an eighth stage wherein, as described previously, packs 11 are aligned and cut in stages while further packs are being picked up by slide 8.

As the second series of packs 71 is picked up in the sixth stage, slide 8 backs the first series up along portion 21 to make room for unloading the second series. When a sufficient number of packs 71 has been unloaded in portion 21, slide 8 moves down, towards, and up past portion 21 to pick up packs 71, which it then carries back and unloads in portion 13. After being aligned, packs 71 are then cut in stages in station 15.

The advantages of the present invention will be clear from the foregoing description.

In particular, machine 1 provides for conveying packs of material between two cutting stations in such a manner as to avoid any sliding contact and, therefore, misalignment of the same. This is achieved by means of a highly original system featuring a shuttle (slide 8) which may be operated both vertically and horizontally as required. Moreover, the substantially comb-shaped design of work surface 7, and the fact that it is divided into three portions at different levels, afford considerable freedom of movement of slide 8 for unloading and picking up even only part of the material at any point along surface 7. A further point to note is that the material handling system and the design of surface 7 are both cheap and easy to produce. Finally, as already stated, machine 1 provides for simultaneous withdrawal from station 4 and cutting in station 15, thus reducing operating time and increasing the output of machine 1.

To those skilled in the art it will be clear that changes may be made to machine 1 as described and illustrated herein without, however, departing from the scope of the present invention.

I claim:

1. A panel cutting machine for cutting and transporting panels, comprising:
    a) a pair of first and second work stations, the panels being transported from the first to second work station, each of the stations comprising:
        1) cutting means for cutting the panels along a cutting axis, the cutting axis of one of the cutting means being positionable to be perpendicular to the cutting axis of the other cutting means;
        2) a station work surface for supporting the panels in their respective stations; and
        3) a pusher for feeding the panels along their respective station work surfaces and into their respective cutting means;
    b) a medial work surface disposed fixedly between the station work surfaces for supporting the panels between the stations, the medial work surface comprising a set of parallel support members and being divided into first and second portions, the first and second portions being disposed at different levels; and
    c) a slide adjacent to the medial work surface for picking up and transferring the panels between the first and second portions of the medial work surface without pushing the panels on the medial work surface, the slide being slidable along both horizontal and vertical axes independently and comprising a set of parallel support elements, the support elements of the slide being parallel to the support members of the medial work surface, at least some of the support elements of the slide being oriented between at least some of the support members of the medial work surface whereby the parallel support elements of the slide are slidable both horizontally and vertically through the parallel support members of the medial work surface, wherein the medial work surface further comprises a third portion having parallel support members in line with and parallel to the support members of the first and second portions, the third portion being adjacent to and at a greater height than the second portion, the slide being slidable vertically through and horizontally below each of the first, second, and third portions.

2. The machine of claim 1, wherein the cutting means, pushers, and pick up means are coordinated by an electronic control.

3. The machine of claim 1, wherein the station work surface of the first station comprises a set of parallel support bar portions parallel to the support elements of the slide, at least some of the parallel support bar portions being disposed between and adjacent to at least some of the support elements of the slide.

4. The panel cutting machine of claim 1, wherein the first portion is disposed adjacent to the first work station and the second portion is disposed adjacent to the second work station, the first portion being lower than the second portion.

* * * * *